United States Patent
Larose, Jr. et al.

(10) Patent No.: US 8,991,155 B2
(45) Date of Patent: Mar. 31, 2015

(54) VEHICLE AND A METHOD OF DETERMINING A REDUCTANT STORAGE CAPACITY SET POINT OF A SELECTIVE CATALYTIC REDUCTION FILTER OF AN EXHAUST TREATMENT SYSTEM OF THE VEHICLE

(71) Applicant: GM Global Technology Operations LLC, Detroit, MI (US)

(72) Inventors: Thomas Larose, Jr., Howell, MI (US); Christopher Whitt, Howell, MI (US); Christopher C. Swoish, Lapeer, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 13/967,731

(22) Filed: Aug. 15, 2013

(65) Prior Publication Data

US 2015/0047319 A1    Feb. 19, 2015

(51) Int. Cl.
*F01N 3/035* (2006.01)
*F01N 3/18* (2006.01)

(52) U.S. Cl.
CPC ...................................... *F01N 3/18* (2013.01)

USPC ................... 60/286; 60/274; 60/295; 60/297; 60/301; 60/311

(58) Field of Classification Search
USPC ............ 60/274, 277, 286, 295, 297, 301, 311
See application file for complete search history.

(56) References Cited

U.S. PATENT DOCUMENTS

| 7,758,676 B2 | 7/2010 | Mital et al. |
| 8,141,340 B2 | 3/2012 | Garimella et al. |
| 2014/0182270 A1* | 7/2014 | Jun ................................ 60/274 |

* cited by examiner

*Primary Examiner* — Thomas Denion
*Assistant Examiner* — Jorge Leon, Jr.
(74) *Attorney, Agent, or Firm* — Quinn Law Group, PLLC (57) ABSTRACT

A vehicle and a method of determining a reductant storage capacity set point of a selective catalytic reduction filter (SCRF) of an exhaust treatment system of a vehicle are disclosed. The method includes determining a storage estimate of a reductant inside the SCRF and determining a particulate estimate in the SCRF representative of an amount of particulate matter collected inside the SCRF. The method also includes determining a particulate correction factor from the particulate estimate and calculating, via a controller, a set point value of the reductant in the SCRF by computing together the particulate correction factor and the storage estimate to determine the reductant storage capacity set point of the SCRF.

36 Claims, 2 Drawing Sheets

Fig-6

VEHICLE AND A METHOD OF DETERMINING A REDUCTANT STORAGE CAPACITY SET POINT OF A SELECTIVE CATALYTIC REDUCTION FILTER OF AN EXHAUST TREATMENT SYSTEM OF THE VEHICLE

TECHNICAL FIELD

The present disclosure relates to a vehicle and a method of determining a reductant storage capacity set point of a selective catalytic reduction filter of an exhaust treatment system of the vehicle.

BACKGROUND

Internal combustion engines can produce byproducts of the fuel combustion process, including various oxides of nitrogen, referred to collectively herein as NOx gases. Exhaust gas treatment systems can be used in vehicles to treat the NOx gases created in the combustion process.

Exhaust gas treatment systems generally include a selective catalytic reduction (SCR) device to reduce NOx gases. The SCR device uses a reductant capable of reacting with NOx gases to convert the NOx gases into inert byproducts, i.e., nitrogen and water. For example, the reductant can be an aqueous solution of urea, which is injected into the engine's exhaust stream. Once the reductant is in the exhaust stream, the reductant is absorbed into a catalyst of the SCR device, where the catalytic action of the SCR device ultimately converts NOx gases into the inert byproducts.

Exhaust gas treatment systems also include a diesel particulate filter (DPF) to filter out particles or particulate matter in the exhaust stream that is emitted by the engine. Generally, the DPF captures or traps sooty particulate matter and other suspended particulate matter from the exhaust stream. For example, the particulate matter can include carbonaceous soot particulates that can be oxidized to produce gaseous carbon dioxide, as well as other non-combustible particulates (i.e., ash) that are not capable of being oxidized.

Generally, the SCR device is spaced from the DPF such that the SCR device and the DPF are separate and independent components. Therefore, the SCR device converts NOx gases into the inert byproducts independently of the particulate matter being trapped by the DPF.

In-situ thermal regeneration of the DPF can be conducted periodically to burn off the accumulated particulate matter. However, thermal regeneration cannot remove ash from the DPF, and therefore, ash continues to accumulate in the DPF throughout the life of the DPF.

SUMMARY

The present disclosure provides a method of determining a reductant storage capacity set point of a selective catalytic reduction filter (SCRF) of an exhaust treatment system of a vehicle. The method includes determining a storage estimate of a reductant inside the SCRF and determining a particulate estimate in the SCRF representative of an amount of particulate matter collected inside the SCRF. The method also includes determining a particulate correction factor from the particulate estimate and calculating, via a controller, a set point value of the reductant in the SCRF by computing together the particulate correction factor and the storage estimate to determine the reductant storage capacity set point of the SCRF.

The present disclosure also provides a vehicle including an engine that generates an exhaust stream during operation and an exhaust treatment system coupled to the engine. The exhaust treatment system includes a selective catalytic reduction filter (SCRF) to catalytically convert constituents in the exhaust stream into inert byproducts and to filter particulate matter from the exhaust stream. The exhaust treatment system also includes a controller in communication with the SCRF, with the controller including a processor and a memory having recorded instructions for determining a reductant storage capacity set point of the SCRF of the exhaust treatment system. The controller is configured to determine a storage estimate of a reductant inside the SCRF and determine a particulate estimate in the SCRF representative of an amount of particulate matter collected inside the SCRF. The controller is also configured to determine a particulate correction factor from the particulate estimate and calculate a set point value of the reductant in the SCRF by computing together the particulate correction factor and the storage estimate to determine the reductant storage capacity set point of the SCRF.

Therefore, various types of particulate matter is taken into consideration to determine the reductant storage capacity set point of the SCRF, and thus, optimize the exhaust treatment system. By accounting for various particulate matter in the SCRF, various models can be more accurately calibrated to maximize NOx reduction efficiencies and minimize expelling the reductant out of the SCRF. Furthermore, accounting for various particulate matter in the SCRF can optimize emissions and fuel economy of the vehicle.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
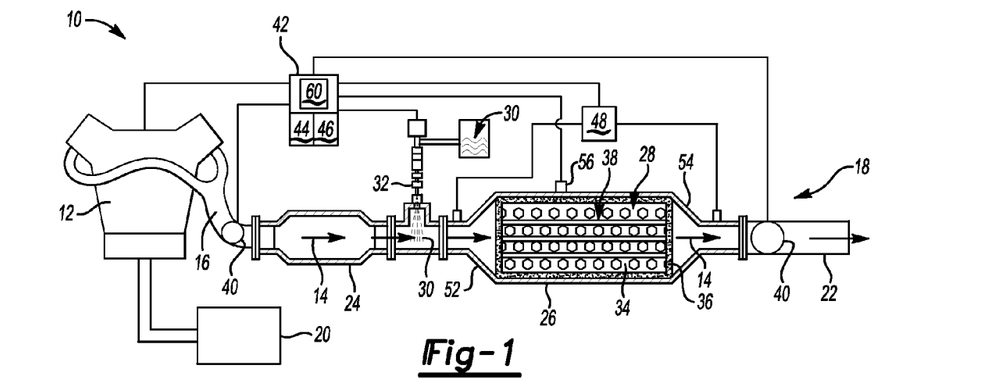
FIG. 1 is a schematic illustration of a vehicle including an engine and an exhaust treatment system.

Referring to the Figures, wherein like numerals indicate like or corresponding parts throughout the several views, a vehicle 10 is generally shown in FIG. 1. The vehicle 10 includes an engine 12 that generates an exhaust stream 14 (arrow 14) during operation. The engine 12 can be an internal combustion engine such as diesel engine or any other engine that emits gases, such as oxides of nitrogen (NOx), i.e., NOx gases, into the exhaust stream 14. An exhaust gas tube 16 is coupled to the engine 12 and receives the exhaust gas from the engine 12 such that the exhaust stream 14 moves through the exhaust gas tube 16. While a diesel engine application is described hereinafter for illustrative purposes only, those skilled in the art will appreciate that a similar approach can be taken with other engine designs.

The vehicle 10 includes an exhaust treatment system 18 coupled to the engine 12. The exhaust treatment system 18 treats various constituents in the exhaust gas such as NOx gases. In other words, the exhaust treatment system 18 treats various emissions contained in the exhaust stream 14 expelled from the engine 12.

As shown in FIG. 1, the vehicle 10 includes a tank 20 for storing fuel, such as, for example, diesel fuel. The diesel fuel is drawn from the tank 20 and combusted in the engine 12 which generates the exhaust stream 14, and the exhaust stream 14 is then processed through the exhaust treatment system 18 before being expelled from a tailpipe 22.

The exhaust system 18 includes a series of exhaust after-treatment devices 24, 26, shown in FIG. 1 as an oxidation catalyst 24, such as a diesel oxidation catalyst 24 (DOC), and a selective catalyst reduction filter 26 (SCRF) which are each discussed in detail below. Accordingly, the exhaust gas tube 16 directs the exhaust gas stream 14 from the engine 12 through the series of exhaust after-treatment devices 24, 26. Depending on the embodiment, the after-treatment devices 24, 26 of the exhaust system 18 can be arranged in other orders than shown in FIG. 1. Collectively, the DOC 24 and the SCRF 26 condition the exhaust stream 14.

As discussed above, the exhaust after-treatment devices 24, 26 are utilized to reduce various exhaust emissions of the engine 12. For example, the DOC 24 receives the exhaust gas stream 14 from the engine 12 to oxidize and burn hydrocarbon emissions present in the exhaust stream 14. The DOC 24 is in communication with a fuel injection device that delivers a calibrated amount of fuel into the DOC 24. Ignition of the injected fuel rapidly increases the temperature of the exhaust stream 14, generally 600° C. (Celsius) or higher, in order to enable a thermal regeneration of the SCRF 26.

In one example, following the DOC 24, the exhaust stream 14 is routed to the SCRF 26. In other words, the SCRF 26 is disposed downstream to the DOC 24. Generally, the SCRF 26 catalytically converts constituents in the exhaust stream 14 into inert byproducts and filters particulate matter from the exhaust stream 14. In other words, the SCRF 26 treats various emissions contained in the exhaust stream 14 and also filters particulate matter, such as soot and ash, from the exhaust stream 14. Therefore, generally, the SCRF 26 performs multiple functions, such as, treating NOx gases and filtering soot and ash from the exhaust stream 14 (each of which are discussed in turn below). Simply stated, SCRF 26 is utilized to reduce NOx emissions and particulate matter expelled from the engine 12 powering the vehicle 10.

Continuing with FIG. 1, the SCRF 26 includes an active catalytic component 28, referred to herein as a catalyst 28. The catalyst 28 can be an oxide of a base metal such as vanadium, molybdenum, tungsten and zeolite. A reductant 30 is utilized to convert NOx gases into inert byproducts. As such, the SCRF 26 is converting NOx gases with the aid of the catalyst 28 into inert byproducts, i.e., diatomic nitrogen $N_2$, and water $H_2O$. The reductant 30 can be anhydrous ammonia, aqueous ammonia, ammonia precursors, aqueous solution of urea or any other suitable reductant 30, which is added to the exhaust stream 14 and absorbed in the SCRF 26. An injector 32 (see FIG. 1) or any other suitable device can be utilized to add the reductant 30 to the exhaust stream 14.

Exhaust emissions of both gasoline engines 12 and diesel engines 12 can be optimized by utilizing the SCRF 26. For the diesel engine embodiment, the reductant 30 can be a diesel-exhaust-fluid (DEF) that is used in SCRF 26. Accordingly, the DEF is disposed on the catalyst 28 of the SCRF 26 as the exhaust gas stream 14 flows through SCRF 26.

Referring to FIG. 1, the SCRF 26 can include a carrier or substrate 34 that is dipped into a washcoat 36 containing the active catalytic component 28, i.e., the catalyst 28. Generally, the washcoat 36 is applied to or coated on a surface of the substrate 34 for absorbing the reductant 30. More specifically, the substrate 34 is porous and the washcoat 36 is applied or coated on the surface of the substrate 34 within the pores. The substrate 34 can be a ceramic brick or a ceramic honeycomb structure, a plate structure, or any other suitable structure. In other words, the washcoat 36 can be applied to the surface of the pores of the ceramic brick. For example, the substrate 34 can be formed of silicon carbide (SiC), cordierite or any other suitable substrate being highly porous. The washcoat 36 attracts the reductant 30 to deposit the reductant 30 in the SCRF 26. In other words, the reductant 30 is disposed on the washcoat 36 inside the SCRF 26. As the exhaust stream 14 passes through the SCRF 26, the reductant 30 interacts with the exhaust gas stream 14 to generate a chemical reaction which reduces NOx gases passing through the exhaust system 18.

As the exhaust gas stream 14 passes through the SCRF 26, the particulate matter emitted from the engine 12 is collected in the SCRF 26. Therefore, the SCRF 26 can include a filter 38 (see FIG. 1) for collecting the particulate matter. As such, for example, the filter 38 of the SCRF 26 collects sooty particulate matter during a soot loading phase and disposes of the sooty particulate matter through the regeneration process. Generally, carbonaceous soot particulates can be oxidized during the regeneration process to produce gaseous carbon dioxide. The efficiency of the SCRF 26 can also be degraded due to an amount of soot accumulated on the SCRF 26, during the soot loading phase leading up to the regeneration process. In other words, the combustible particulate matter, such as soot, can build on the surface of the SCRF 26 which can degrade the efficiency of the SCRF 26. In-situ thermal regeneration of the SCRF 26 can be conducted periodically to burn off accumulated sooty particulate matter. In other words, when a predetermined amount of soot builds inside the SCRF 26, thermal regeneration can be conducted to remove the soot from inside the SCRF 26. Therefore, over the life of the SCRF 26, many thermal regenerations can be performed to the SCRF 26 to periodically remove soot.

Furthermore, as the exhaust gas stream 14 passes through the SCRF 26, the SCRF 26 collects other non-combustible particulates (i.e., ash) emitted from the engine 12. In other words, the filter 38 of the SCRF 26 collects particulate matter such as ash. For example, ash can form as a result of oil being burned during the engine combustion process. However, the other non-combustible particulates, such as ash, are not capable of being oxidized during the regeneration process. Therefore, ash accumulates inside the SCRF 26 after each thermal regeneration removing soot. Specifically, ash continues to accumulate in the filter 38 of the SCRF 26 throughout the life of the SCRF 26. In other words, ash cannot be removed from the SCRF 26 unless the SCRF 26 is removed from the vehicle 10. Therefore, ash builds inside the SCRF 26 throughout the life of the SCRF 26. As the ash builds inside the filter 38, the ash can accumulate on the surface of the substrate 34, thus reducing the area of the washcoat 36 to react with the reductant 30. Therefore, the efficiency of the SCRF 26 can be degraded due to an amount of ash accumulation on the SCRF 26. In other words, ash can build inside the SCRF 26 which can degrade the efficiency of the SCRF 26.

Continuing with FIG. 1, the exhaust system 18 can further include at least one NOx sensor 40. In one embodiment, the NOx sensor 40 can be positioned upstream to the SCRF 26. For example, the NOx sensor 40 can be positioned upstream to the DOC 24 and the SCRF 26 such that the NOx sensor 40 is disposed between the engine 12 and the DOC 24. As another example, the NOx sensor 40 can be positioned upstream to the SCRF 26 such that the NOx sensor 40 is disposed between the DOC 24 and the SCRF 26. In another embodiment, the NOx sensor 40 can be positioned downstream to the SCRF 26. For example, the NOx sensor 40 can be positioned between the SCRF 26 and the tailpipe 22. In another embodiment, the NOx sensor 40 can be defined as a plurality of NOx sensors 40, with one of the NOx sensors 40 positioned upstream to the DOC 24 and another one of the NOx sensors 40 positioned downstream to the SCRF 26. Structurally and functionally, the NOx sensors 40 can be different or identical.

The exhaust system 18 can further include a controller 42 (see FIG. 1) in communication with various components of the vehicle 10. For example, the controller 42 is in communication with the SCRF 26. As another example, the controller 42 can be in communication with each of the NOx sensors 40. Therefore, the NOx sensors 40 can send or communicate NOx level measurements to the controller 42. The controller 42 can be a stand-alone unit, or be part of an electronic controller that regulates the operation of the engine 12. The controller 42 can include a processor 44 and a memory 46 having recorded instructions for determining a reductant storage capacity set point of the SCRF 26 of the exhaust treatment system 18, as discussed further below. For example, the controller 42 can be a host machine or distributed system, e.g., a computer such as a digital computer or microcomputer, acting as a vehicle control module, and/or as a proportional-integral-derivative (PID) controller device having a processor, and tangible, non-transitory memory such as read-only memory (ROM) or flash memory. The controller 42 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 42 can include all software, hardware, memory 46, algorithms, connections, sensors, etc., necessary to monitor and control the exhaust treatment system 18 and the engine 12. As such, a control method operative to evaluate and determine the reductant storage capacity set point can be embodied as software or firmware associated with the controller 42. Furthermore, the control method operative to evaluate and initiate a regeneration can be embodied as software or firmware associated with the controller 42. It is to be appreciated that the controller 42 can also include any device capable of analyzing data from various sensors, comparing data, making the necessary decisions required to control and monitor the exhaust treatment system 18.

Furthermore, the exhaust system 18 can include a particulate filter sensor 48 (see FIG. 1) that measures the differential pressure across the SCRF 26. In other words, the particulate filter sensor 48 can measure a pressure difference 50 (see FIGS. 5 and 6) in the SCRF 26. Generally, the controller 42 can be in communication with the particulate filter sensor 48. Therefore, the particulate filter sensor 48 can send or communicate the pressure difference 50 across the SCRF 26. The particulate filter sensor 48 measures and calculates the pressure difference 50 between an inlet side 52 and an outlet side 54 of the SCRF 26. The particulate filter sensor 48 can be a unitary sensor or gauge connected to the SCRF 26. Alternatively, the particulate filter sensor 48 can be embodied as a pair of pressure taps that individually read the inlet and outlet pressures, and then calculates the pressure difference 50 across the SCRF 26. The particulate filter sensor 48 can return a resultant pressure measurement to the controller 42.

Additionally, the exhaust system 18 can include a temperature sensor 56 (see FIG. 1) that measures a temperature 58 (see FIGS. 3-6) of the substrate 34 of the SCRF 26. Generally, the controller 42 can be in communication with the temperature sensor 56. Therefore, the temperature sensor 56 can send or communicate the temperature 58 of the substrate 34 to the controller 42. It is to be appreciated that more than one temperature sensor 56 can be utilized with the exhaust system 18.

After the exhaust gas stream 14 exits the SCRF 26, the exhaust stream 14 passes through the tailpipe 22. In other words, the tailpipe 22 is disposed downstream of the SCRF 26. In one embodiment, the SCRF 26 is disposed between the DOC 24 and the tailpipe 22.

Various inputs can be communicated to and from the controller 42. These inputs can be inputted into a reductant storage model 60 within the controller 42. For example, the reductant storage model 60 can be utilized to determine the reductant storage capacity set point of the SCRF 26. Specifically, the reductant storage capacity set point provides a target amount of reductant 30 to be stored on the washcoat 36 of the substrate 34 of the SCRF 26 to maximize the operating efficiency of the SCRF 26. Therefore, various information is relayed to the controller 42 which can be utilized for the reductant storage model 60. The addition of the washcoat 36 to the filter 38 of the SCRF 26 adds an extra source of variation to be accounted for to determine the reductant storage capacity set point of the SCRF 26. As such, as ash and soot collect inside the SCRF 26, the area of the surface (of the substrate 34) presenting the catalyst 28 that absorbs the reductant 30 is reduced. In other words, as the ash and soot collect inside the SCRF 26, some of the washcoat 36 (including the catalyst 28) is covered by the ash/soot which decreases the area of the washcoat 36 being able to absorb the reductant 30. Accordingly, the reductant storage model 60 captures and accounts for ash/soot accumulation inside the SCRF 26.

Figure 2:
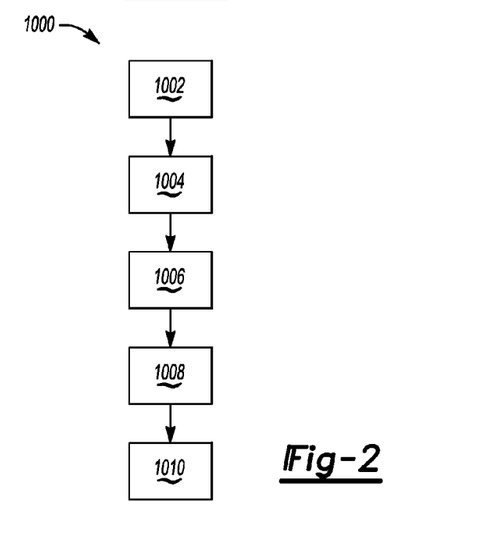
FIG. 2 is a schematic flowchart of a method of determining a reductant storage capacity set point of a selective catalytic reduction filter (SCRF) of the exhaust treatment system of the vehicle.

The controller 42 collects information about the reductant 30, thus, as ash and soot accumulate inside the SCRF 26, the amount of the washcoat 36 being able to absorb the reductant 30 decreases. Therefore, ash accumulation is taken into consideration to determine the reductant storage capacity set point of the SCRF 26, and thus, optimize the exhaust treatment system 18. Furthermore, independently of ash accumulation, soot accumulation before the regeneration process, is taken into consideration to determine the reductant storage capacity set point of the SCRF 26, and thus, optimize the exhaust treatment system 18. Referring to FIG. 2, the present disclosure provides a method 1000 of determining the reductant storage capacity set point of the SCRF 26 of the exhaust treatment system 18 of the vehicle 10. In other words, the method 1000 determines the target amount of the reductant 30 to be stored on the washcoat 36 of the substrate 34 of the SCRF 26. Specifically, by determining the reductant storage capacity set point of the SCRF 26, the amount of reductant 30 being passed into the exhaust stream 14 can be more accurately adjusted to ultimately minimize NOx gases from being discharged out the tailpipe 22.

The method includes determining 1002 a storage estimate 62 of the reductant 30 inside the SCRF 26 and determining 1004 a particulate estimate 64 in the SCRF 26 representative of an amount of particulate matter collected inside the SCRF 26. The method also includes determining 1006 a particulate correction factor 66 from the particulate estimate 64 and calculating 1008, via the controller 42, a set point value 68 of the reductant 30 in the SCRF 26 by computing together the particulate correction factor 66 and the storage estimate 62 to determine the reductant storage capacity set point of the SCRF 26. Generally, determining 1004 the particulate estimate 64 can include determining at least one of an amount of fuel consumption 70 in the engine 12 of the vehicle 10, an amount of oil burned 72 in the engine 12, a total number 74 of thermal regenerations performed to the SCRF 26, the pressure difference 50 across the SCRF 26, the temperature 58 of the substrate 34 of the SCRF 26 and a total time 76 since the last thermal regeneration performed to the SCRF 26. As such, determining at least one of an amount of fuel consumption 70 in the engine 12 of the vehicle 10, an amount of oil burned 72 in the engine 12, a total number 74 of thermal regenerations performed to the SCRF 26, the pressure difference 50 across the SCRF 26, the temperature 58 of the substrate 34 of the SCRF 26 and a total time 76 since the last thermal regeneration performed to the SCRF 26 should be construed to include non-exclusive logical "or", i.e., at least one of an amount of fuel consumption 70 in the engine 12 of the vehicle 10 or an amount of oil burned 72 in the engine 12 or a total number 74 of thermal regenerations performed to the SCRF 26 or the pressure difference 50 across the SCRF 26 or the temperature 58 of the substrate 34 of the SCRF 26 or a total time 76 since the last thermal regeneration performed to the SCRF 26 or combinations thereof, which are discussed further below.

The storage estimate 62 of the reductant 30 can be determined by utilizing various inputs. One of the inputs that can be utilized is the temperature 58 of the substrate 34 of the SCRF 26. Another one of the inputs that can be utilized is an exhaust flow estimate 78 through the SCRF 26. Therefore, in certain embodiments, determining 1002 the storage estimate 62 of the reductant 30 can include obtaining the temperature 58 of the substrate 34 of the SCRF 26. Furthermore, in certain embodiments, determining 1002 the storage estimate 62 of the reductant 30 can include determining the exhaust flow estimate 78 through the SCRF 26. Therefore, determining 1002 the storage estimate 62 can include selecting a first numeric value from a storage rate map 80 based on the temperature 58 of the substrate 34 and the exhaust flow estimate 78 through the SCRF 26. It is to be appreciated that other inputs can be utilized to determine the storage estimate 62 of the reductant 30, such as for example, pressures, NOx levels, the total miles the vehicle 10 has traveled, time, etc. Furthermore, it is to be appreciated that the one or a combination of more than one of the temperature 58 of the substrate 34, the exhaust flow estimate 78, etc., can be utilized to determine the storage estimate 62. It is to be appreciated that the storage rate map 80 can be populated using numeric data obtained either through empirical testing or through analytic formulation.

Figure 3:
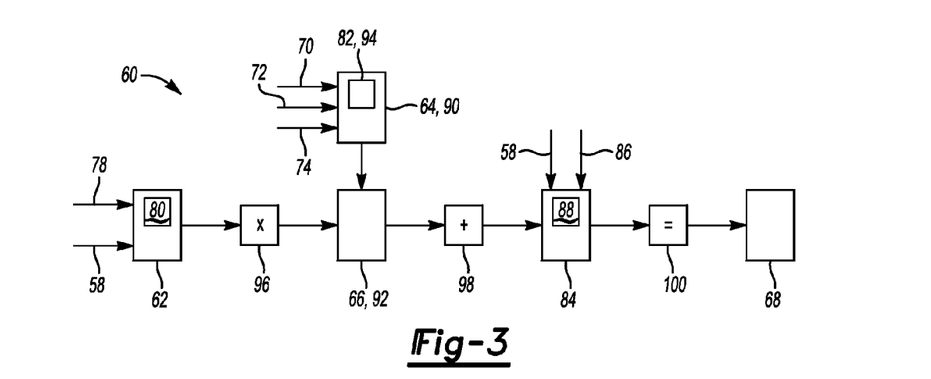
FIG. 3 is a schematic diagram of a reductant storage model of a first embodiment.
Figure 4:
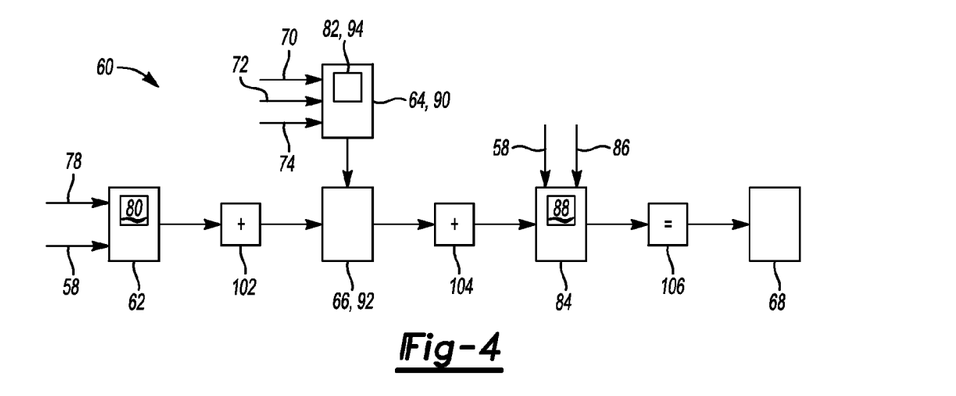
FIG. 4 is a schematic diagram of a reductant storage model of a second embodiment.
Figure 5:
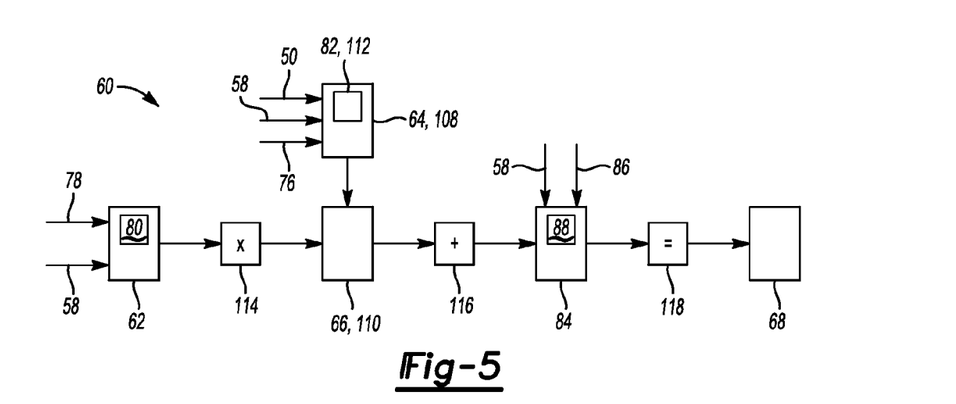
FIG. 5 is a schematic diagram of a reductant storage model of a third embodiment.
Figure 6:
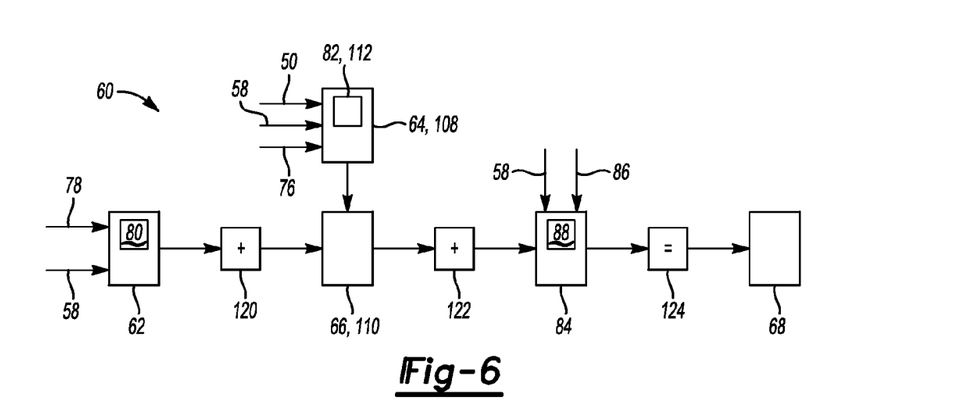
FIG. 6 is a schematic diagram of a reductant storage model of a fourth embodiment.

Generally, the particulate correction factor 66 is a second numeric value of less than 1.0. Therefore, determining 1006 the particulate correction factor 66 can include selecting the second numeric value from a look-up table 82. The look-up table 82 expresses the particulate correction factor 66 as a function of the amount of particulate matter inside the SCRF 26. Furthermore, in the embodiments of FIGS. 3 and 5, the particulate correction factor 66 decreases as the amount of particulate matter increases inside the SCRF 26. In the embodiments of FIGS. 4 and 6, the particulate correction factor 66 increases as the amount of particulate matter increases inside the SCRF 26.

The method can further include determining 1010 an aged correction estimate 84 of the SCRF 26. The aged correction estimate 84 can be determined by utilizing various inputs. One of the inputs can be a usage time 86 of the SCRF 26. Another one of the inputs can be the temperature 58 of the substrate 34 of the SCRF 26. As such, more specifically, determining 1010 the aged correction estimate 84 of the SCRF 26 can include obtaining the usage time 86 of the SCRF 26. Furthermore, determining 1010 the aged correction estimate 84 of the SCRF 26 can include obtaining the temperature 58 of the substrate 34 of the SCRF 26. Therefore, the controller 42, configured to calculate the set point value 68 of the reductant 30, is further defined as the controller 42 being configured to calculate the set point value 68 of the reductant 30 in the SCRF 26 by computing together the particulate correction factor 66 and the storage estimate 62 and then adding the aged correction estimate 84 to determine the reductant storage capacity set point of the SCRF 26.

In certain embodiments, determining 1010 the aged correction estimate 84 can include selecting the aged correction estimate 84 from a correction map 88 based on the usage time 86 of the SCRF 26 and the temperature 58 of the substrate 34 of the SCRF 26. As such, the controller 42 is configured to determine the aged correction estimate 84 of the SCRF 26 from the correction map 88 based on the usage time 86 of the SCRF 26 and the temperature 58 of the substrate 34 of the SCRF 26. Therefore, determining 1010 the aged correction estimate 84 can include selecting a third numeric value from the correction map 88 based on the usage time 86 and the temperature 58 of the substrate 34. As such, calculating 1008 the set point value 68 of the reductant 30 can include calculating the set point value 68 of the reductant 30 in the SCRF 26 by computing together the particulate correction factor 66 and the storage estimate 62 and then adding the aged correction estimate 84 to determine the reductant storage capacity set point of the SCRF 26. In other words, the set point value 68 can be calculated by computing together the first numeric value and the second numeric value and then adding the third numeric value to determine the reductant storage capacity set point of the SCRF 26. It is to be appreciated that other inputs can be utilized to determine the aged correction estimate 84 such as for example, pressures, NOx levels, the total miles the vehicle 10 has traveled, time, etc. Furthermore, it is to be appreciated that the one or a combination of more than one of the usage time 86 of the SCRF 26, the temperature 58 of the substrate 34 of the SCRF 26, etc., can be utilized to determine the aged correction estimate 84. It is to be appreciated that the correction map 88 can be populated using numeric data obtained either through empirical testing or through analytic formulation.

Different mathematical calculations can be utilized to determine the set point value 68 of the reductant 30 in the SCRF 26. FIGS. 3 and 4 represent different mathematical calculations when accounting for non-combustible particulate matter, i.e., ash. FIGS. 5 and 6 represent different mathematical calculations when accounting for combustible particulate matter, i.e. soot. It is to be appreciated that the controller 42 can store one or more of the mathematical calculations of FIGS. 3-6.

Referring to FIGS. 3 and 4, in certain embodiments, the particulate estimate 64 is further defined as an ash loading estimate 90, the particulate correction factor 66 is further defined as an ash correction factor 92, the amount of particulate matter is further defined as an amount of ash and the look-up table 82 is further defined as an ash look-up table 94. Therefore, determining 1004 the particulate estimate 64 in the SCRF 26 representative of the amount of particulate matter inside the SCRF 26 can include determining the ash loading estimate 90 in the SCRF 26 representative of the amount of ash inside the SCRF 26. Furthermore, determining 1006 the particulate correction factor 66 from the particulate estimate 64 can include determining the ash correction factor 92 from the ash loading estimate 90. In addition, determining 1006 the particulate correction factor 66 can include selecting the ash correction factor 92 from the ash look-up table 94. In these embodiments, the ash loading estimate 90 can be a value expressed in grams of ash. Furthermore, as discussed above, for these embodiments, the ash correction factor 92 is the second numeric value of less than 1.0.

For the embodiments of FIGS. 3 and 4, the ash loading estimate 90 can be determined by utilizing various inputs. One of the inputs can be the amount of fuel consumption 70 in the engine 12 of the vehicle 10. Another one of the inputs can be the amount of oil burned 72 in the engine 12. Yet another one of the inputs can be the total number 74 of thermal regenerations performed to the SCRF 26. Therefore, in the embodiments of FIGS. 3 and 4, determining the ash loading estimate 90 can include determining the amount of fuel consumption 70 in the engine 12 of the vehicle 10. Furthermore, in these embodiments, determining the ash loading estimate 90 can include determining the amount of oil burned 72 in the engine 12. Additionally, in these embodiments, determining the ash loading estimate 90 can include obtaining the total number 74 of thermal regenerations performed to the SCRF 26. It is to be appreciated that other inputs can be utilized to determine the ash loading estimate 90, such as for example, pressures, NOx levels, the total miles the vehicle 10 has traveled, time, weight changes of the SCRF 26 over the lifetime of the SCRF 26, etc. Furthermore, it is to be appreciated that the one or a combination of more than one of the amount of fuel consumption 70, the amount of oil burned 72, the total number 74 of thermal regenerations, etc., can be utilized to determine the ash loading estimate 90.

In the embodiment of FIG. 3, calculating 1008, via the controller 42, the set point value 68 of the reductant 30 can include calculating, via the controller 42, the set point value 68 of the reductant 30 in the SCRF 26 by multiplying (box 96) the ash correction factor 92 with the storage estimate 62 to determine the reductant storage capacity set point of the SCRF 26. More specifically, in the embodiment of FIG. 3, calculating 1008 the set point value 68 of the reductant 30 can include calculating the set point value 68 of the reductant 30 in the SCRF 26 by multiplying (box 96) the ash correction factor 92 with the storage estimate 62 and then adding (box 98) the aged correction estimate 84 to determine the reductant storage capacity set point of the SCRF 26. FIG. 3 is a schematic representation of the ash correction factor 92 multiplied (box 96) by the storage estimate 62 and then adding (box 98) the aged correction estimate 84 to equal (box 100) the set point value 68 of the reductant 30 (i.e., the reductant storage capacity set point of the SCRF 26). The controller 42 is configured to calculate the reductant storage capacity set point, and therefore, the controller 42 can store, evaluate, determine, etc., various information, as discussed above, to determine the reductant storage capacity set point of the SCRF 26.

FIG. 4 illustrates another way of calculating the reductant storage capacity set point. As shown in the embodiment of FIG. 4, calculating 1008, via the controller 42, the set point value 68 of the reductant 30 can include calculating, via the controller 42, the set point value 68 of the reductant 30 in the SCRF 26 by adding (box 102) the ash correction factor 92 with the storage estimate 62 to determine the reductant storage capacity set point of the SCRF 26. More specifically, calculating 1008 the set point value 68 of the reductant 30 can include calculating the set point value 68 of the reductant 30 in the SCRF 26 by adding (box 102) the ash correction factor 92 with the storage estimate 62 and then adding (box 104) the aged correction estimate 84 to determine the reductant storage capacity set point of the SCRF 26. FIG. 4 is a schematic representation of the ash correction factor 92 added (box 102) with the storage estimate 62 and then adding (box 104) the aged correction estimate 84 to equal (box 106) the set point value 68 of the reductant 30 (i.e., the reductant storage capacity set point of the SCRF 26). Again, the controller 42 is configured to calculate the reductant storage capacity set point, and therefore, the controller 42 can store, evaluate, determine, etc., various information, as discussed above, to determine the reductant storage capacity set point of the SCRF 26.

Referring to FIGS. 5 and 6, in other embodiments, the particulate estimate 64 is further defined as a soot mass estimate 108, the particulate correction factor 66 is further defined as a soot correction factor 110, the amount of particulate matter is further defined as an amount of soot and the look-up table 82 is further defined as a soot look-up table 112. Therefore, determining 1004 the particulate estimate 64 in the SCRF 26 representative of the amount of particulate matter inside the SCRF 26 can include determining the soot mass estimate 108 in the SCRF 26 representative of the amount of soot inside the SCRF 26. Furthermore, determining 1006 the particulate correction factor 66 from the particulate estimate 64 can include determining the soot correction factor 110 from the soot mass estimate 108. Additionally, determining 1006 the particulate correction factor 66 can include selecting the soot correction factor 110 from the soot look-up table 112. In these embodiments, the soot mass estimate 108 can be a value expressed in grams of soot. Furthermore, as discussed above, for these embodiments, the soot correction factor 110 is the second numeric value of less than 1.0. After a thermal regeneration is performed to the SCRF 26, generally, the amount of soot inside the SCRF 26 returns to approximately zero. As such, soot will again accumulate inside the SCRF 26 until the next thermal regeneration. This thermal regeneration cycle continues throughout the life of the vehicle 10.

For the embodiments of FIGS. 5 and 6, the soot mass estimate 108 can be determined by utilizing various inputs. One of the inputs can be the pressure difference 50 across the SCRF 26. Another one of the inputs can be the temperature 58 of the substrate 34 of the SCRF 26. Yet another one of the inputs can be the total time 76 since the last thermal regeneration performed to the SCRF 26. Therefore, in the embodiments of FIGS. 5 and 6, determining the soot mass estimate 108 can include determining the pressure difference 50 across the SCRF 26. Furthermore, in these embodiments, determining the soot mass estimate 108 can include determining the temperature 58 of the substrate 34 of the SCRF 26. Additionally, in these embodiments, determining the soot mass estimate 108 can include determining the total time 76 since the last thermal regeneration performed to the SCRF 26. It is to be appreciated that other inputs can be utilized to determine the soot mass estimate 108, such as for example, pressures, NOx levels, the total miles the vehicle 10 has traveled, time, etc. Furthermore, it is to be appreciated that the one or a combination of more than one of the pressure difference 50 across the SCRF 26, the temperature 58 of the substrate 34, the total time 76 since the last thermal regeneration, etc., can be utilized to determine the soot mass estimate 108. It is to be appreciated that the soot mass estimate 108 can be populated using numeric data obtained either through empirical testing or through analytic formulation.

In the embodiment of FIG. 5, calculating 1008, via the controller 42, the set point value 68 of the reductant 30 can include calculating, via the controller 42, the set point value 68 of the reductant 30 in the SCRF 26 by multiplying (box 114) the soot correction factor 110 with the storage estimate 62 to determine the reductant storage capacity set point of the SCRF 26. More specifically, calculating 1008 the set point value 68 of the reductant 30 can include calculating the set point value 68 of the reductant 30 in the SCRF 26 by multiplying (box 114) the soot correction factor 110 with the storage estimate 62 and then adding (box 116) the aged correction estimate 84 to determine the reductant storage capacity set point of the SCRF 26. FIG. 5 is a schematic representation of the soot correction factor 110 multiplied (box 114) by the storage estimate 62 and then adding (box 116) the aged correction estimate 84 to equal (box 118) the set point value 68 of the reductant 30 (i.e., the reductant storage capacity set point of the SCRF 26). The controller 42 is configured to calculate the reductant storage capacity set point, and therefore, the controller 42 can store, evaluate, determine, etc., various information, as discussed above, to determine the reductant storage capacity set point of the SCRF 26.

FIG. 6 illustrates another way of calculating the reductant storage capacity set point. As shown in the embodiment of FIG. 6, calculating 1008, via the controller 42, the set point value 68 of the reductant 30 can include calculating, via the controller 42, the set point value 68 of the reductant 30 in the SCRF 26 by adding (box 120) the soot correction factor 110 with the storage estimate 62 to determine the reductant storage capacity set point of the SCRF 26. More specifically, calculating 1008 the set point value 68 of the reductant 30 can include calculating the set point value 68 of the reductant 30 in the SCRF 26 by adding (box 120) the soot correction factor 110 with the storage estimate 62 and then adding (box 122) the aged correction estimate 84 to determine the reductant storage capacity set point of the SCRF 26. FIG. 6 is a schematic representation of the soot correction factor 110 added (box 120) with the storage estimate 62 and then adding (box 122) the aged correction estimate 84 to equal (box 124) the set point value 68 of the reductant 30 (i.e., the reductant storage capacity set point of the SCRF 26). Again, the controller 42 is configured to calculate the reductant storage capacity set point, and therefore, the controller 42 can store, evaluate, determine, etc., various information, as discussed above, to determine the reductant storage capacity set point of the SCRF 26.

It is to be appreciated that the order or sequence of performing the method 1000 as identified in the flowchart of FIG. 2 is for illustrative purposes and other orders or sequences are within the scope of the present disclosure. It is to also be appreciated that the method 1000 can include other features not specifically identified in the flowchart of FIG. 2.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of determining a reductant storage capacity set point of a selective catalytic reduction filter (SCRF) of an exhaust treatment system of a vehicle, the method comprising:
   determining a storage estimate of a reductant inside the SCRF;
   determining a particulate estimate in the SCRF representative of an amount of particulate matter collected inside the SCRF;
   determining a particulate correction factor from the particulate estimate; and
   calculating, via a controller, a set point value of the reductant in the SCRF by computing together the particulate correction factor and the storage estimate to determine the reductant storage capacity set point of the SCRF;
   adjusting an amount of reductant being passed into an exhaust stream based on the determined reductant storage capacity set point.

2. A method as set forth in claim 1 wherein determining the storage estimate of the reductant includes obtaining a temperature of a substrate of the SCRF.

3. A method as set forth in claim 2 wherein determining the storage estimate of the reductant includes determining an exhaust flow estimate through the SCRF.

4. A method as set forth in claim 3 wherein determining the storage estimate includes selecting a first numeric value from a storage rate map based on the temperature of the substrate and the exhaust flow estimate through the SCRF.

5. A method as set forth in claim 1 wherein the particulate correction factor is a second numeric value of less than 1.0.

6. A method as set forth in claim 5 wherein determining the particulate correction factor includes selecting the second numeric value from a look-up table, with the look-up table expressing the particulate correction factor as a function of the amount of particulate matter inside the SCRF.

7. A method as set forth in claim 6 wherein the particulate correction factor decreases as the amount of particulate matter increases inside the SCRF.

8. A method as set forth in claim 6 wherein the particulate correction factor increases as the amount of particulate matter increases inside the SCRF.

9. A method as set forth in claim 6 wherein the particulate estimate is further defined as an ash loading estimate, the particulate correction factor is further defined as an ash correction factor, the amount of particulate matter is further defined as an amount of ash and the look-up table is further defined as an ash look-up table, and:
   wherein determining the particulate estimate in the SCRF representative of the amount of particulate matter inside the SCRF includes determining the ash loading estimate in the SCRF representative of the amount of ash inside the SCRF;
   wherein determining the particulate correction factor from the particulate estimate includes determining the ash correction factor from the ash loading estimate;
   wherein calculating, via the controller, the set point value of the reductant includes calculating, via the controller, the set point value of the reductant in the SCRF by multiplying the ash correction factor with the storage estimate to determine the reductant storage capacity set point of the SCRF;
   wherein determining the particulate correction factor includes selecting the ash correction factor from the ash look-up table.

10. A method as set forth in claim 9 further comprising determining an aged correction estimate of the SCRF and wherein calculating the set point value of the reductant includes calculating the set point value of the reductant in the SCRF by multiplying the ash correction factor with the storage estimate and then adding the aged correction estimate to determine the reductant storage capacity set point of the SCRF.

11. A method as set forth in claim 6 wherein the particulate estimate is further defined as an ash loading estimate, the particulate correction factor is further defined as an ash correction factor, the amount of particulate matter is further defined as an amount of ash and the look-up table is further defined as an ash look-up table, and:
   wherein determining the particulate estimate in the SCRF representative of the amount of particulate matter inside the SCRF includes determining the ash loading estimate in the SCRF representative of the amount of ash inside the SCRF;
   wherein determining the particulate correction factor from the particulate estimate includes determining the ash correction factor from the ash loading estimate;
   wherein calculating, via the controller, the set point value of the reductant includes calculating, via the controller, the set point value of the reductant in the SCRF by adding the ash correction factor with the storage estimate to determine the reductant storage capacity set point of the SCRF;
   wherein determining the particulate correction factor includes selecting the ash correction factor from the ash look-up table.

12. A method as set forth in claim 11 further comprising determining an aged correction estimate of the SCRF and wherein calculating the set point value of the reductant includes calculating the set point value of the reductant in the SCRF by adding the ash correction factor with the storage estimate and then adding the aged correction estimate to determine the reductant storage capacity set point of the SCRF.

13. A method as set forth in claim 6 wherein the particulate estimate is further defined as a soot mass estimate, the particulate correction factor is further defined as a soot correction factor, the amount of particulate matter is further defined as an amount of soot and the look-up table is further defined as a soot look-up table, and:
   wherein determining the particulate estimate in the SCRF representative of the amount of particulate matter inside the SCRF includes determining the soot mass estimate in the SCRF representative of the amount of soot inside the SCRF;
   wherein determining the particulate correction factor from the particulate estimate includes determining the soot correction factor from the soot mass estimate;
   wherein calculating, via the controller, the set point value of the reductant includes calculating, via the controller, the set point value of the reductant in the SCRF by multiplying the soot correction factor with the storage estimate to determine the reductant storage capacity set point of the SCRF;
   wherein determining the particulate correction factor includes selecting the soot correction factor from the soot look-up table.

14. A method as set forth in claim 13 further comprising determining an aged correction estimate of the SCRF and wherein calculating the set point value of the reductant includes calculating the set point value of the reductant in the SCRF by multiplying the soot correction factor with the storage estimate and then adding the aged correction estimate to determine the reductant storage capacity set point of the SCRF.

15. A method as set forth in claim 6 wherein the particulate estimate is further defined as a soot mass estimate, the particulate correction factor is further defined as a soot correction factor, the amount of particulate matter is further defined as an amount of soot and the look-up table is further defined as a soot look-up table, and:
   wherein determining the particulate estimate in the SCRF representative of the amount of particulate matter inside the SCRF includes determining the soot mass estimate in the SCRF representative of the amount of soot inside the SCRF;
   wherein determining the particulate correction factor from the particulate estimate includes determining the soot correction factor from the soot mass estimate;
   wherein calculating, via the controller, the set point value of the reductant includes calculating, via the controller, the set point value of the reductant in the SCRF by adding the soot correction factor with the storage estimate to determine the reductant storage capacity set point of the SCRF;
   wherein determining the particulate correction factor includes selecting the soot correction factor from the soot look-up table.

16. A method as set forth in claim 15 further comprising determining an aged correction estimate of the SCRF and wherein calculating the set point value of the reductant includes calculating the set point value of the reductant in the SCRF by adding the soot correction factor with the storage estimate and then adding the aged correction estimate to determine the reductant storage capacity set point of the SCRF.

17. A method as set forth in claim 1 further comprising determining an aged correction estimate of the SCRF and wherein calculating the set point value of the reductant includes calculating the set point value of the reductant in the SCRF by computing together the particulate correction factor and the storage estimate and then adding the aged correction estimate to determine the reductant storage capacity set point of the SCRF.

18. A method as set forth in claim 17 wherein determining the aged correction estimate includes selecting the aged correction estimate from a correction map based on a usage time of the SCRF and a temperature of a substrate of the SCRF.

19. A vehicle comprising:
   an engine that generates an exhaust stream during operation;
   an exhaust treatment system coupled to the engine and including:
      a selective catalytic reduction filter (SCRF) to catalytically convert constituents in the exhaust stream into inert byproducts and to filter particulate matter from the exhaust stream;
      a controller in communication with the SCRF, with the controller including a processor and a memory having recorded instructions for determining a reductant storage capacity set point of the SCRF of the exhaust treatment system, wherein the controller is configured to:
         determine a storage estimate of a reductant inside the SCRF;
         determine a particulate estimate in the SCRF representative of an amount of particulate matter collected inside the SCRF;

determine a particulate correction factor from the particulate estimate; and calculate a set point value of the reductant in the SCRF by computing together the particulate correction factor and the storage estimate to determine the reductant storage capacity set point of the SCRF;

adjust an amount of reductant being passed into the exhaust stream based on the determined reductant storage capacity set point.

20. A vehicle as set forth in claim 19 wherein the controller is configured to determine the storage estimate of the reductant by obtaining a temperature of a substrate of the SCRF.

21. A vehicle as set forth in claim 20 wherein the controller is configured to determine the storage estimate of the reductant by determining an exhaust flow estimate through the SCRF.

22. A vehicle as set forth in claim 21 wherein the controller is configured to determine the storage estimate by selecting a first numeric value from a storage rate map based on the temperature of the substrate and the exhaust flow estimate through the SCRF.

23. A vehicle as set forth in claim 19 wherein the particulate correction factor is a second numeric value of less than 1.0.

24. A vehicle as set forth in claim 23 wherein the controller is configured to determine the particulate correction factor by selecting the second numeric value from a look-up table, with the look-up table expressing the particulate correction factor as a function of the amount of particulate matter inside the SCRF.

25. A vehicle as set forth in claim 24 wherein the particulate correction factor decreases as the amount of particulate matter increases inside the SCRF.

26. A vehicle as set forth in claim 24 wherein the particulate correction factor increases as the amount of particulate matter increases inside the SCRF.

27. A vehicle as set forth in claim 24 wherein the particulate estimate is further defined as an ash loading estimate, the particulate correction factor is further defined as an ash correction factor, the amount of particulate matter is further defined as an amount of ash and the look-up table is further defined as an ash look-up table, and:

wherein the controller is configured to determine the particulate estimate in the SCRF representative of the amount of particulate matter inside the SCRF by determining the ash loading estimate in the SCRF representative of the amount of ash inside the SCRF;

wherein the controller is configured to determine the particulate correction factor from the particulate estimate by determining the ash correction factor from the ash loading estimate;

wherein the controller is configured to calculate the set point value of the reductant is further defined as the controller is configured to calculate the set point value of the reductant in the SCRF by multiplying the ash correction factor with the storage estimate to determine the reductant storage capacity set point of the SCRF;

wherein the controller is configured to determine the particulate correction factor by selecting the ash correction factor from the ash look-up table.

28. A vehicle as set forth in claim 27:

wherein the controller is configured to determine an aged correction estimate of the SCRF; and wherein the controller is configured to calculate the set point value of the reductant is further defined as the controller is configured to calculate the set point value of the reductant in the SCRF by multiplying the ash correction factor with the storage estimate and then adding the aged correction estimate to determine the reductant storage capacity set point of the SCRF.

29. A vehicle as set forth in claim 24 wherein the particulate estimate is further defined as an ash loading estimate, the particulate correction factor is further defined as an ash correction factor, the amount of particulate matter is further defined as an amount of ash and the look-up table is further defined as an ash look-up table, and:

wherein the controller is configured to determine the particulate estimate in the SCRF representative of the amount of particulate matter inside the SCRF by determining the ash loading estimate in the SCRF representative of the amount of ash inside the SCRF;

wherein the controller is configured to determine the particulate correction factor from the particulate estimate by determining the ash correction factor from the ash loading estimate;

wherein the controller is configured to calculate the set point value of the reductant is further defined as the controller is configured to calculate the set point value of the reductant in the SCRF by adding the ash correction factor with the storage estimate to determine the reductant storage capacity set point of the SCRF;

wherein the controller is configured to determine the particulate correction factor by selecting the ash correction factor from the ash look-up table.

30. A vehicle as set forth in claim 29:

wherein the controller is configured to determine an aged correction estimate of the SCRF; and wherein the controller is configured to calculate the set point value of the reductant is further defined as the controller is configured to calculate the set point value of the reductant in the SCRF by adding the ash correction factor with the storage estimate and then adding the aged correction estimate to determine the reductant storage capacity set point of the SCRF.

31. A vehicle as set forth in claim 24 wherein the particulate estimate is further defined as a soot mass estimate, the particulate correction factor is further defined as a soot correction factor, the amount of particulate matter is further defined as an amount of soot and the look-up table is further defined as a soot look-up table, and:

wherein the controller is configured to determine the particulate estimate in the SCRF representative of the amount of particulate matter inside the SCRF by determining the soot mass estimate in the SCRF representative of the amount of soot inside the SCRF;

wherein the controller is configured to determine the particulate correction factor from the particulate estimate by determining the soot correction factor from the soot mass estimate;

wherein the controller is configured to calculate the set point value of the reductant is further defined as the controller is configured to calculate the set point value of the reductant in the SCRF by multiplying the soot correction factor with the storage estimate to determine the reductant storage capacity set point of the SCRF;

wherein the controller is configured to determine the particulate correction factor by selecting the soot correction factor from the soot look-up table.

32. A vehicle as set forth in claim 31:

wherein the controller is configured to determine an aged correction estimate of the SCRF; and wherein the controller is configured to calculate the set point value of the reductant is further defined as the controller is configured to calculate the set point value of the reductant in the SCRF by multiplying the soot correction factor with the storage estimate and then adding the aged correction estimate to determine the reductant storage capacity set point of the SCRF.

33. A vehicle as set forth in claim 24 wherein the particulate estimate is further defined as a soot mass estimate, the particulate correction factor is further defined as a soot correction factor, the amount of particulate matter is further defined as an amount of soot and the look-up table is further defined as a soot look-up table, and:
- wherein the controller is configured to determine the particulate estimate in the SCRF representative of the amount of particulate matter inside the SCRF by determining the soot mass estimate in the SCRF representative of the amount of soot inside the SCRF;
- wherein the controller is configured to determine the particulate correction factor from the particulate estimate by determining the soot correction factor from the soot mass estimate;
- wherein the controller is configured to calculate the set point value of the reductant is further defined as the controller is configured to calculate the set point value of the reductant in the SCRF by adding the soot correction factor with the storage estimate to determine the reductant storage capacity set point of the SCRF;
- wherein the controller is configured to determine the particulate correction factor by selecting the soot correction factor from the soot look-up table.

34. A vehicle as set forth in claim 33:
- wherein the controller is configured to determine an aged correction estimate of the SCRF; and
- wherein the controller is configured to calculate the set point value of the reductant is further defined as the controller is configured to calculate the set point value of the reductant in the SCRF by adding the soot correction factor with the storage estimate and then adding the aged correction estimate to determine the reductant storage capacity set point of the SCRF.

35. A vehicle as set forth in claim 19:
- wherein the controller is configured to determine an aged correction estimate of the SCRF; and
- wherein the controller is configured to calculate the set point value of the reductant is further defined as the controller is configured to calculate the set point value of the reductant in the SCRF by computing together the particulate correction factor and the storage estimate and then adding the aged correction estimate to determine the reductant storage capacity set point of the SCRF.

36. A vehicle as set forth in claim 35 wherein the controller is configured to determine the aged correction estimate by selecting the aged correction estimate from a correction map based on a usage time of the SCRF and a temperature of a substrate of the SCRF.

* * * * *